United States Patent [19]
Lan

[11] Patent Number: 5,628,343
[45] Date of Patent: May 13, 1997

[54] RAPID COUPLER

[76] Inventor: Wu-Zhen Lan, 58, Ma Yuan West St., Taichung, Taiwan

[21] Appl. No.: 615,722

[22] Filed: Mar. 13, 1996

[51] Int. Cl.⁶ .................................................. F16L 37/28
[52] U.S. Cl. ............................. 137/614.05; 137/614.03; 251/149.5
[58] Field of Search ........................... 251/149.6, 149.5; 137/614.03, 614.05

[56] References Cited

U.S. PATENT DOCUMENTS 2,761,469  9/1956  Hansen .......................... 137/614.05

FOREIGN PATENT DOCUMENTS 492528  3/1954  Italy ............................... 251/149.5
708613  5/1954  United Kingdom .............. 137/614.05

Primary Examiner—A. Michael Chambers

[57] ABSTRACT

A rapid coupler comprises a main body and an auxiliary coupler. The main body has a main tube and a coupling tube at the rear of the main tube. The auxiliary coupler has a retaining pipe and a coupling pipe in front of the retaining pipe. A first compression spring and an elastic plug are inserted in the main tube. A second compression spring and an elastic block are inserted in the retaining pipe. The main body couples with the auxiliary coupler.

1 Claim, 5 Drawing Sheets

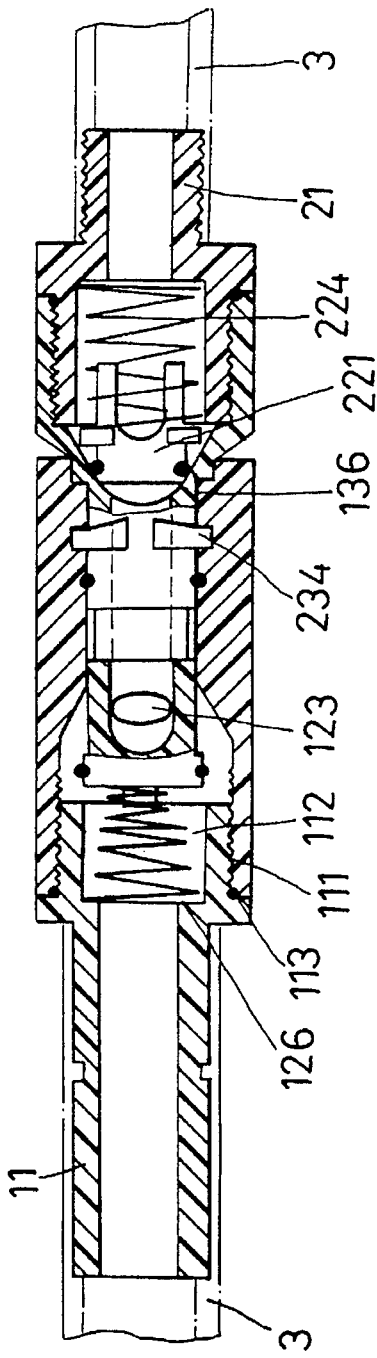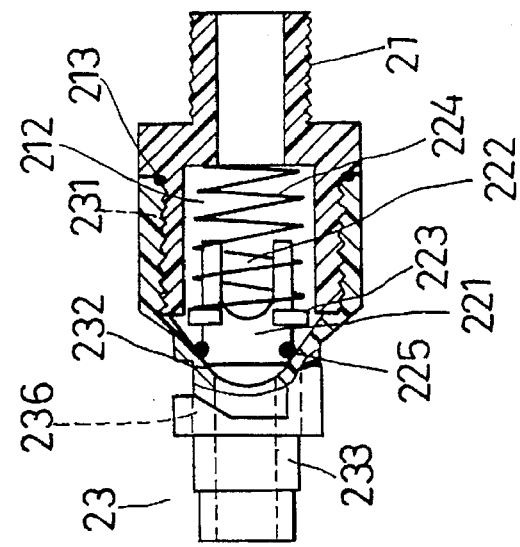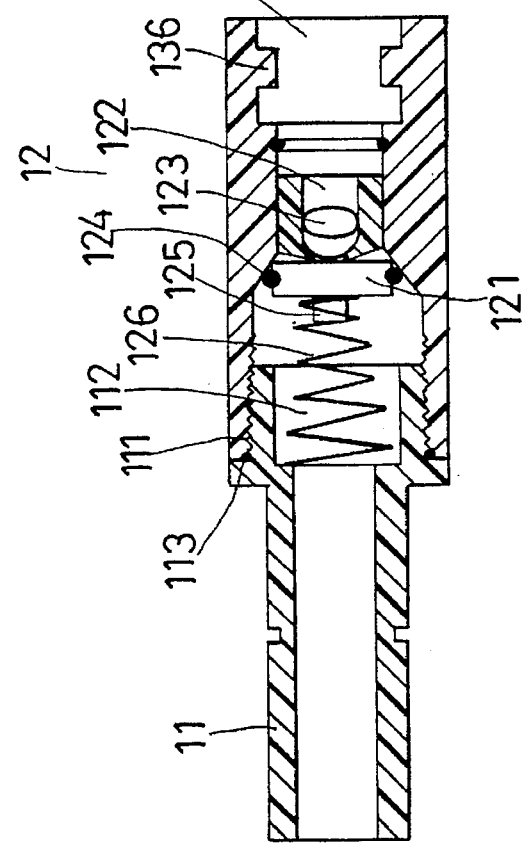

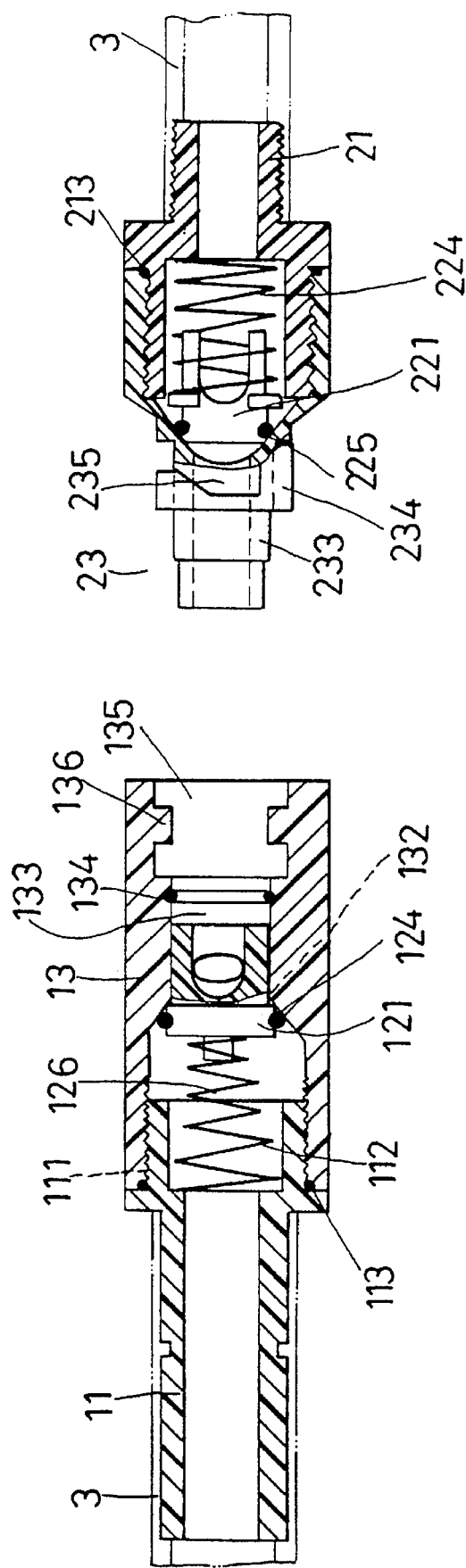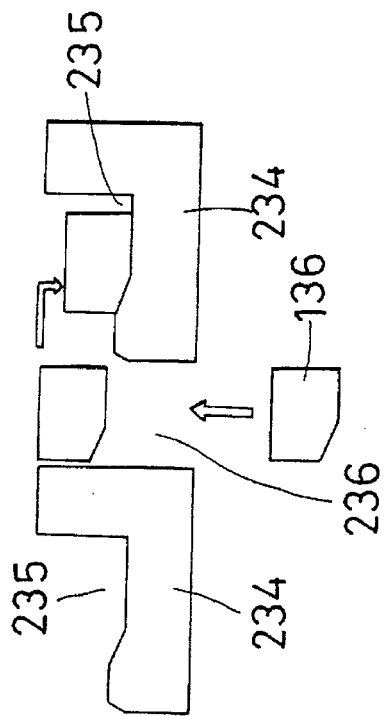
Fig. 4
Fig. 7

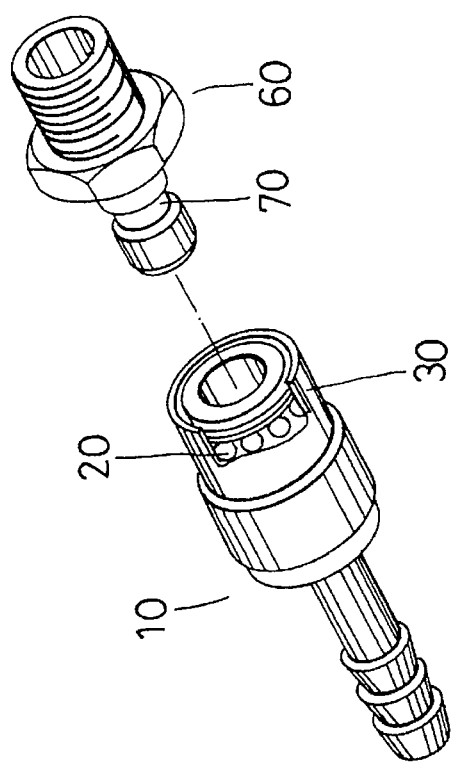
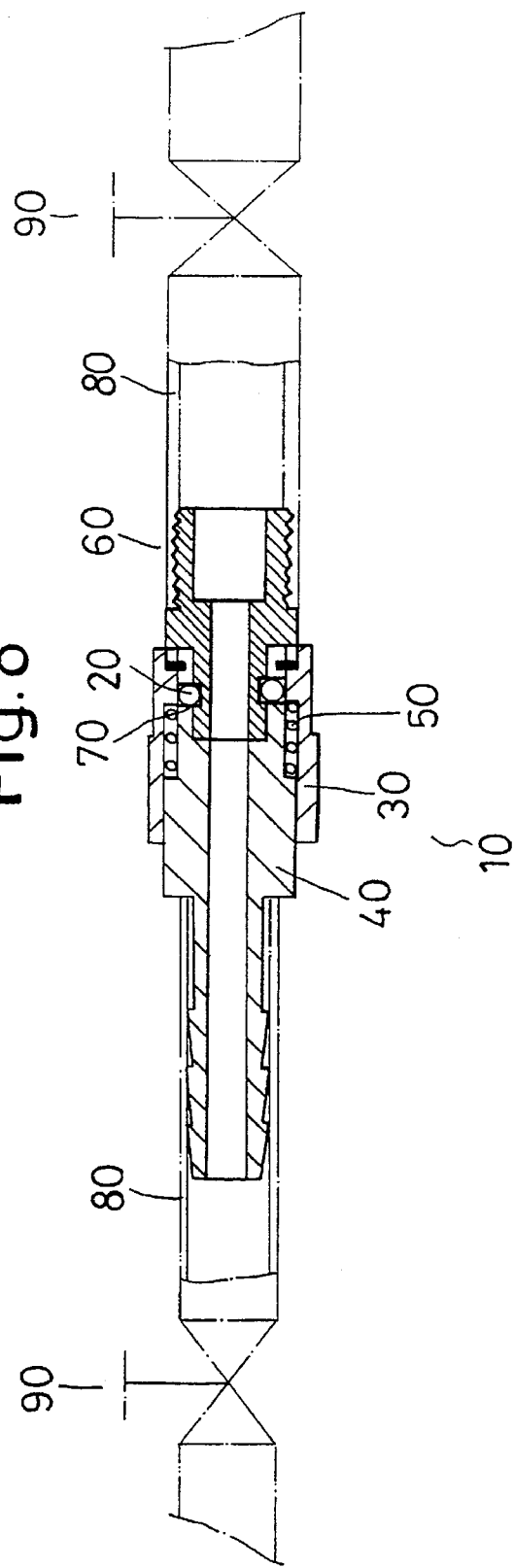

RAPID COUPLER

BACKGROUND OF THE INVENTION

The invention relates to a rapid coupler. More particularly, the invention relates to a rapid coupler which avoids the separation of the rapid coupler while the pressure of the liquid therein is very large.

Referring to FIGS. 8 and 9, a conventional coupler comprises a main body 10 coupling with an auxiliary coupler 60. The auxiliary coupler 60 has an outer circular groove 70. The main body 10 has a pipe 40, a sleeve 30 enclosing a top portion of the pipe 40, a plurality of metal balls 20 disposed between the sleeve 30 and the circular groove 70, and a compression spring 50 disposed between the sleeve 30 and the pipe 40. However, the liquid in the conventional coupler will flow out of the coupler while the coupler is detached. Two switches 90 should be disposed on the transportation pipe 80 connecting the main body 10 and the transportation pipe 80 connecting the auxiliary coupler 60, respectively. The user has to switch off the switches 90 before detaching the main body 10 and the auxiliary coupler 60. Further, the metal balls 20 will be oxidized after the metal balls 20 contact the liquid such as water or liquid chemicals for a long period of time. Thus the metal balls 20 will be rusted. The rusted metal balls 20 may engage with the auxiliary coupler 60 very tight, so it is very difficult to detach the auxiliary coupler 60 from the main body 10. If the auxiliary coupler 60 is not inserted in the main body 10 tightly, the liquid will flow out of the gap between the main body 10 and the auxiliary coupler 60.

SUMMARY OF THE INVENTION

An object of the invention is to provide a rapid coupler which avoids the separation of the rapid coupler while the pressure of the liquid therein is very large.

Another object of the invention is to provide a rapid coupler which avoids the metal elements therein.

Another object of the invention is to provide a rapid coupler which can be detached without the outflow of liquid.

Accordingly, a rapid coupler comprises a main body and an auxiliary coupler. The main body has a main tube and a coupling tube at a rear of the main tube. The auxiliary coupler has a retaining pipe and a coupling pipe in a front of the retaining pipe. The coupling tube has a front portion with a first interior therein. The front portion of the coupling tube has an outer thread. The main tube has a base portion with an inner thread therein. A second interior and an inner protrusion are formed in the front portion of the main tube. A narrow hole is formed in the middle portion of the main tube. A first O-ring encloses the front portion of the coupling tube. A first compression spring and an elastic plug are inserted in the first interior. The elastic plug has a rear protruded post, a circular plug in the front of the rear protruded post, a lateral oval hole adjacent to the circular plug, and a central hole therein. A second O-ring is disposed around the circular plug. The outer thread of the front portion of the coupling tube couples with the inner thread of the base portion. The auxiliary coupler has a retaining pipe and a coupling pipe in the front of the retaining pipe. The retaining pipe has an inner thread in the inner periphery of the retaining pipe, two block flanges on the outer periphery of the retaining pipe, a notch formed between two block flanges, and a groove adjacent to two block flanges. A tapered cone hole is formed in the middle portion of the retaining pipe. The coupling pipe has a third interior therein and a rear portion with an outer thread on the outer periphery of the rear portion. A fourth O-ring encloses the rear portion of the coupling pipe. A second compression spring and an elastic block are inserted in the third interior. The elastic block has a rear tapered block, two lateral fins, and a slot formed in the front of the elastic block. A fifth O-ring receives the rear tapered block. The outer thread of the rear portion of the coupling pipe couples with the inner thread of the retaining pipe.

BRIEF DESCRIPTION OF THE DRAWINGS

FIG. 2 is a cross-sectional view of an assembled main body and an assembled auxiliary coupler;

FIG. 3 is a cross-sectional, assembly view of FIG. 1;

FIG. 4 is a schematic view illustrating the detachment of an assembled main body and an assembled auxiliary coupler;

FIGS. 5 to 7 are schematic views illustrating the coupling of an assembled main body and an assembled auxiliary coupler;

FIG. 8 is a perspective exploded view of a coupler of the prior art; and

FIG. 9 is a schematic view illustrating the assembly of a coupler of the prior art and two pipes.

DETAILED DESCRIPTION OF THE INVENTION

Figure 1:
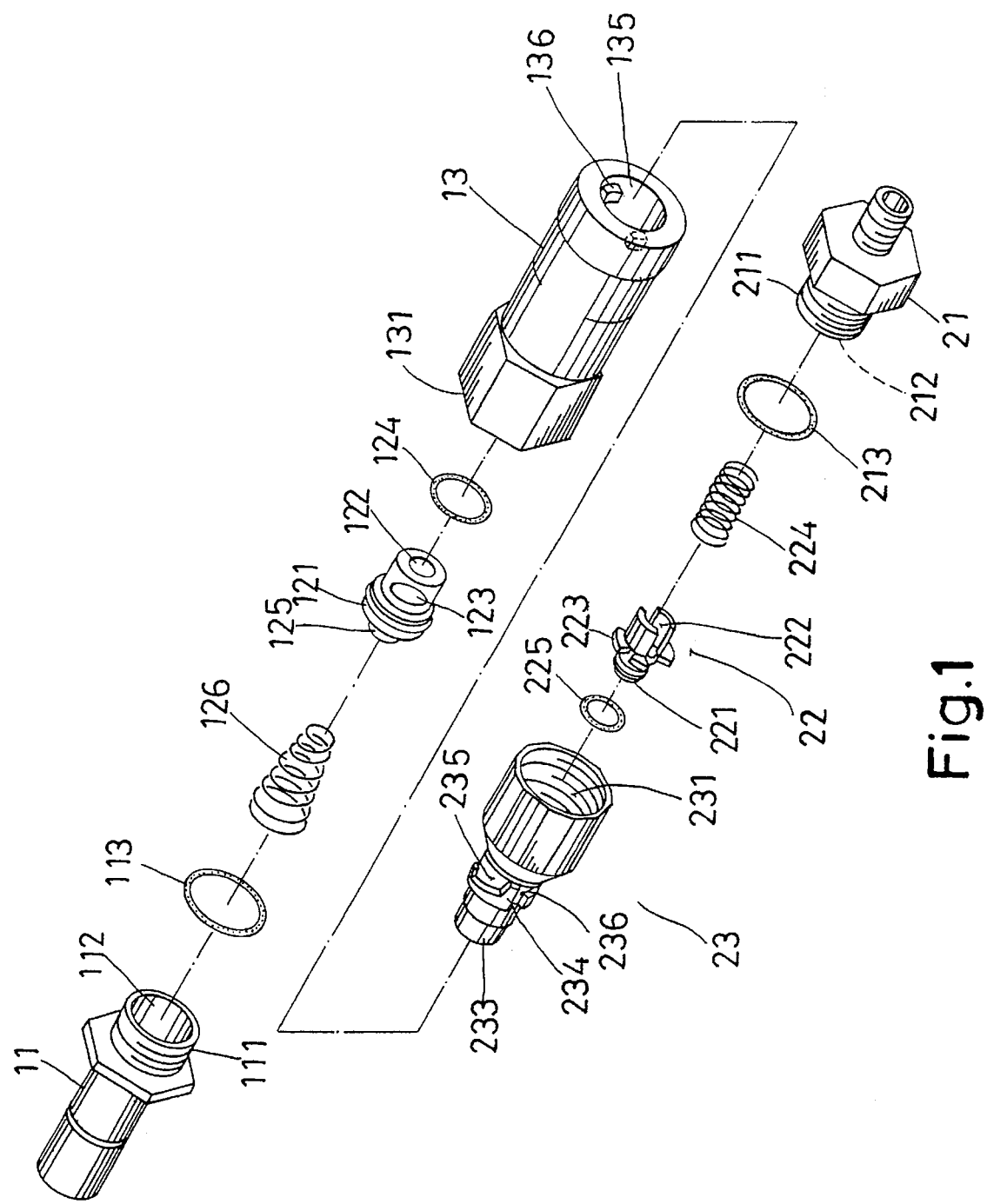
FIG. 1 is a perspective exploded view of a rapid coupler of a preferred embodiment in accordance with the invention.
Figure 6:
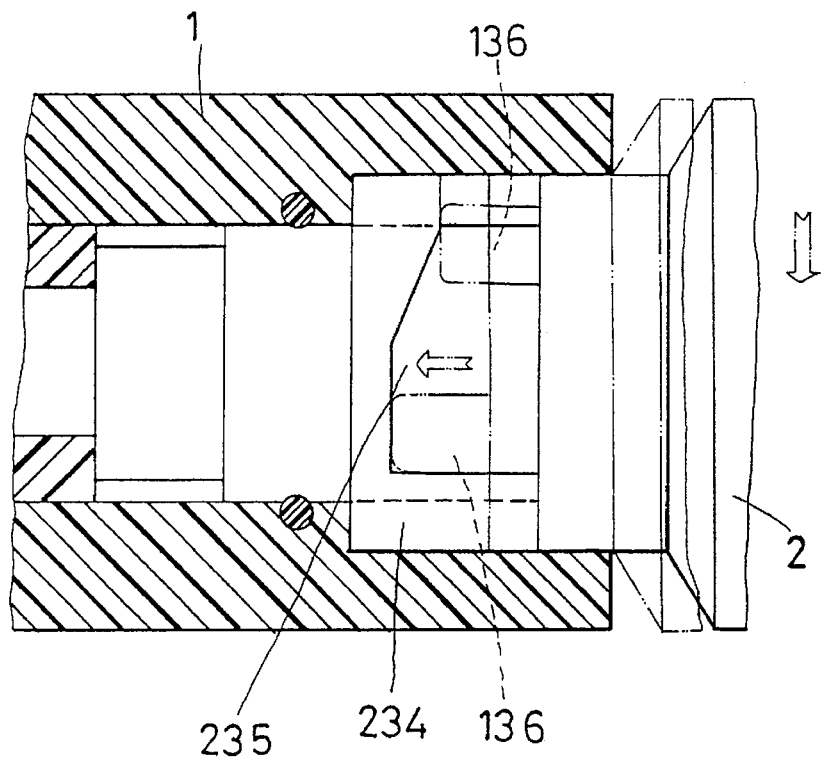
Figure 5:
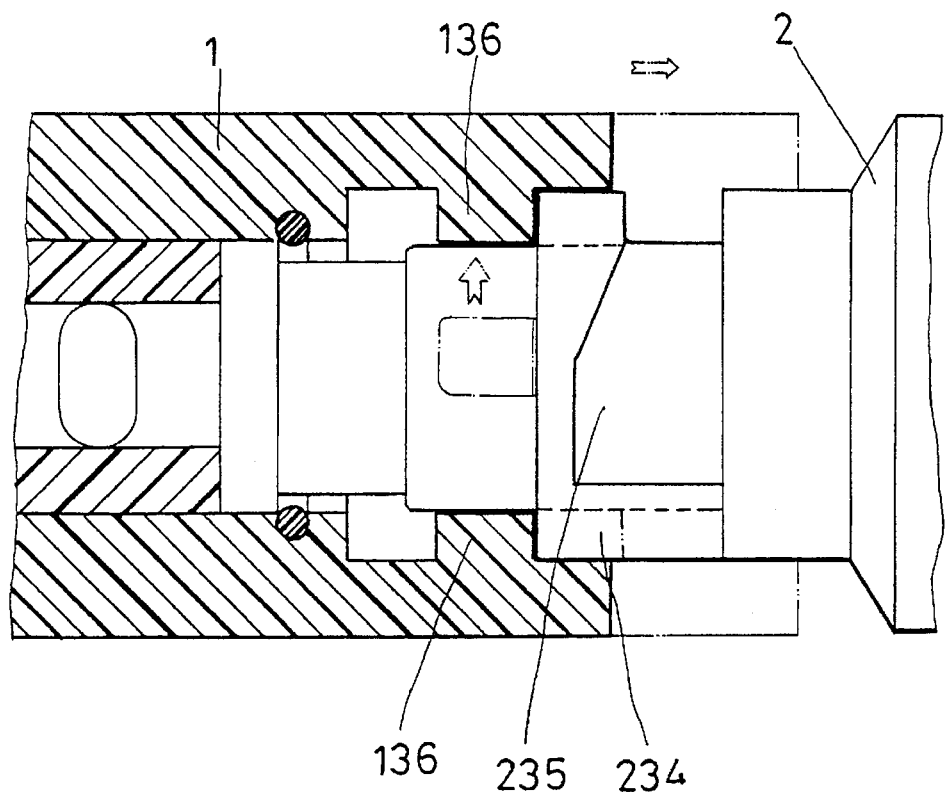

Referring to FIGS. 1 to 3, a rapid coupler comprises a main body 1 and an auxiliary coupler 2. The main body 1 has a main tube 13 and a coupling tube 11 at a rear of the main tube 13. The auxiliary coupler 2 has a retaining pipe 23 and a coupling pipe 21 in a front of the retaining pipe 23. The coupling tube 11 has a front portion 111 with a first interior 112 therein. The front portion 111 of the coupling tube 11 has an outer thread. The main tube 13 has a base portion 131 with an inner thread therein. A second interior 135 and an inner protrusion 136 are formed in the front portion of the main tube 13. A narrow hole 133 is formed in the middle portion of the main tube 13. A first O-ring 113 encloses the front portion 111 of the coupling tube 11. A first compression spring 126 and an elastic plug 12 are inserted in the first interior 112. The elastic plug 12 has a rear protruded post 125, a circular plug 121 in the front of the rear protruded post 125, a lateral oval hole 123 adjacent to the circular plug 121, and a central hole 122 therein. A second O-ring 124 is disposed around the circular plug 121. The outer thread of the front portion 111 of the coupling tube 11 couples with the inner thread of the base portion 131. The auxiliary coupler 2 has a retaining pipe 23 and a coupling pipe 21 in the front of the retaining pipe 23. The retaining pipe 23 has an inner thread 231 in the inner periphery of the retaining pipe 23, two block flanges 234 on the outer periphery of the retaining pipe 23, a notch 236 formed between two block flanges 234, and a groove 235 adjacent to two block flanges 234. A tapered cone hole 232 is formed in the middle portion of the retaining pipe 23. The coupling pipe 21 has a third interior 212 therein and a rear portion 211 with an outer thread on the outer periphery of the rear portion 211. A fourth O-ring 213 encloses the rear portion of the coupling pipe 21. A second compression spring 224 and an elastic block 22 are inserted in the third interior 212. The elastic block 22 has a rear tapered block 221, two lateral fins 223, and a slot 222 formed in the front of the elastic block 22. A fifth O-ring 225 receives the rear tapered block 221. The outer thread of the rear portion 211 of the coupling pipe 21 couples with the inner thread 231 of the retaining pipe 23. A rear portion of the retaining pipe 23 is inserted in the second interior 135.

Referring to FIGS. 4 to 7, most elements of the rapid coupler are made of plastics (except the compression springs 126 and 224). When the rear portion of the retaining pipe 23 is inserted in the second interior 135, the protrusions 136 pass through the corresponding notches 236 to engage with the corresponding block flanges 234. Then the retaining pipe 23 is rotated ninety degrees. Thus the rapid coupler will not be separated while the pressure of the liquid therein is very large. Referring to FIG. 4 again, the detachment of an assembled main body 1 and an assembled auxiliary coupler 2 is illustrated. The compression spring 126 will push the elastic plug 12 to block the tapered hole 132 in the main tube 13. The compression spring 224 will push the elastic block 22 to block the tapered cone hole 232 in the retaining pipe 23. Thus the rapid coupler can be detached without the outflow of liquid.

The invention is not limited to the above embodiment but various modification thereof may be made. Further, various changes in form and detail may be made without departing from the scope of the invention.

I claim:

1. A rapid coupler comprising:

a main body having a main tube and a coupling tube at a rear of said main tube;

an auxiliary coupler having a retaining pipe and a coupling pipe in a front of said retaining pipe;

said coupling tube having a front portion with a first interior therein;

said front portion of said coupling tube having an outer thread;

said main tube having a base portion with an inner thread therein;

a second interior and an inner protrusion formed in a front portion of said main tube;

a narrow hole formed in a middle portion of said main tube;

a first O-ring enclosing said front portion of said coupling tube;

a first compression spring and an elastic plug inserted in said first interior;

said elastic plug having a rear protruded post, a circular plug in a front of said rear protruded post, a lateral oval hole adjacent to said circular plug, and a central hole therein;

a second O-ring disposed around said circular plug;

said outer thread of said front portion of said coupling tube coupling with said inner thread of said base portion;

said auxiliary coupler having a retaining pipe and a coupling pipe in a front of said retaining pipe;

said retaining pipe having an inner thread in an inner periphery of said retaining pipe, two block flanges on an outer periphery of said retaining pipe, a notch formed between said block flanges, and a groove adjacent to said block flanges;

a tapered cone hole formed in a middle portion of said retaining pipe;

said coupling pipe having a third interior therein and a rear portion with an outer thread on an outer periphery of said rear portion;

a fourth O-ring enclosing said rear portion of said coupling pipe;

a second compression spring and an elastic block inserted in said third interior;

said elastic block having a rear tapered block, two lateral fins, and a slot formed in a front of said elastic block;

a fifth O-ring receiving said rear tapered block;

said outer thread of said rear portion of said coupling pipe coupling with said inner thread of said retaining pipe; and a rear portion of said retaining pipe inserted in said second interior, said inner protrusions passing through said corresponding notches to engage with said corresponding block flanges, and said retaining pipe rotated ninety degrees.

* * * * *